United States Patent [19]

Jonsson

[11] 4,358,140
[45] Nov. 9, 1982

[54] PIPE COUPLING DEVICE

[75] Inventor: Gunnar Jonsson, Akersberga, Sweden

[73] Assignee: Nolic I Borlange AB, Borlange, Sweden

[21] Appl. No.: 221,265

[22] Filed: Dec. 30, 1980

[30] Foreign Application Priority Data

Jan. 4, 1980 [SE] Sweden .................................. 8000082

[51] Int. Cl.³ .............................................. F16L 21/06
[52] U.S. Cl. ...................................... 285/419; 285/80; 285/81; 285/373
[58] Field of Search ................. 285/419, 373, 365, 80, 285/81, 45

[56] References Cited

U.S. PATENT DOCUMENTS 3,776,579 12/1973 Gale ................................. 285/373 X
3,930,674 1/1976 Jonsson ........................... 285/371 X

FOREIGN PATENT DOCUMENTS 889203 12/1971 Canada ................................ 285/373

Primary Examiner—Thomas F. Callaghan
Attorney, Agent, or Firm—Cushman, Darby & Cushman

[57] ABSTRACT

The invention relates to a device for locking pipe and hose couplings of the type comprising two complementary, radially fixed members provided with external, radial abutment surfaces facing on both sides in the axial direction for arcuate locking elements meshing with said abutment surfaces and having inwardly extending end edges, said locking elements being adapted to be fitted over the coupling members and being fixed against radial displacement by a means in the form of a cut ring enclosing said members.

The novel feature is that the enclosing means as well as the locking elements are provided with portions for positive interlocking in fixed condition.

1 Claim, 6 Drawing Figures

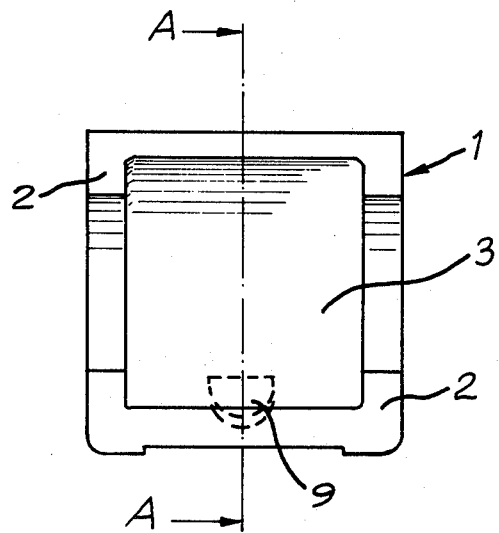
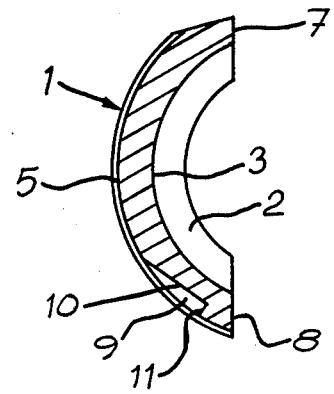
Fig. 2          Fig. 3
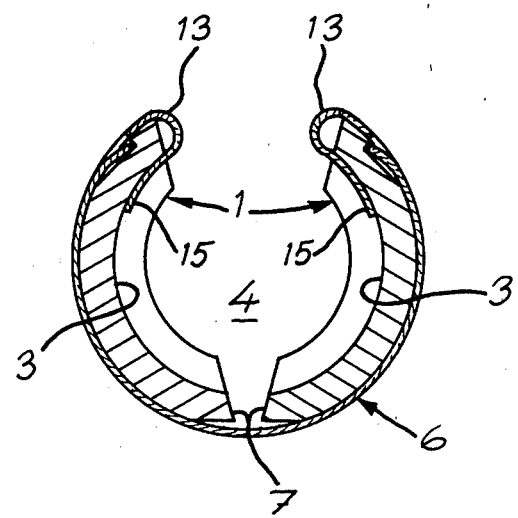
Fig. 4

PIPE COUPLING DEVICE

The present invention relates to a device for locking pipe and hose couplings of the type comprising two complementary, radially fixed members provided with external, radial abutment surfaces facing on both sides in the axial direction for arcuate locking elements meshing with said abutment surfaces and having inwardly extending end edges, said locking elements being adapted to be fitted over the coupling members and being fixed against radial displacement by a means in the form of a cut ring enclosing said members.

Pipe couplings of the type mentioned above are previously known. The problem of keeping the locking elements in position has found various solutions. According to a known embodiment the enclosing means consists of a cut band spring ring which is forced over the locking members after these have been brought into engagement with interacting coupling members. This means that the slotted band spring ring must be strongly widened to be able to straddle the locking elements, which in the long run results in fatiguing of the band spring ring which thus no longer gives the retaining effect required. A plane band spring ring is difficult to handle, especially when the locking members are to be removed and the coupling is to be taken apart. When one tries to bend one end of the band spring ring outwardly this has a tendency to rotate on the locking elements, which renders its removal difficult.

According to another known solution the means functioning as an enclosing means is like a helical spring which is axially displaceable along the coupling so that it can be moved into an active position in which it encloses the locking elements and into an inactive position beyond these elements. Also this embodiment is difficult to handle and it has for one thing the disadvantage that the locking elements drop off as soon as the engagement with the means in question ceases. The same disadvantage is found in said band spring ring embodiment which involves a greater risk of some of the locking elements going astray because the spring ring often catches a locking element and throws it away.

The object of the invention is to provide a device for a coupling of the type mentioned in the introduction, enabling easy mounting and dismounting of the enclosing means, while avoiding subjecting the enclosing means to heavy bending, whereby it would risk being fatigued, and the enclosing means also in dismounted condition can be handled as a unit coherent with the locking elements.

The essential characteristic of the device according to the invention is that the enclosing means as well as the locking elements are provided with portions for positive interlocking in fixed position.

A preferred embodiment of the device according to the invention will be described in more detail hereinafter with reference to the accompanying drawings, in which:

FIG. 2 shows one of the locking elements as seen from the side facing the centre axis;

FIG. 3 is a section of the same locking element taken on line A—A in FIG. 2;

FIG. 4 is a cross-section taken in the same way through a unit consisting of two locking elements and an enclosing means;

Figure 1:
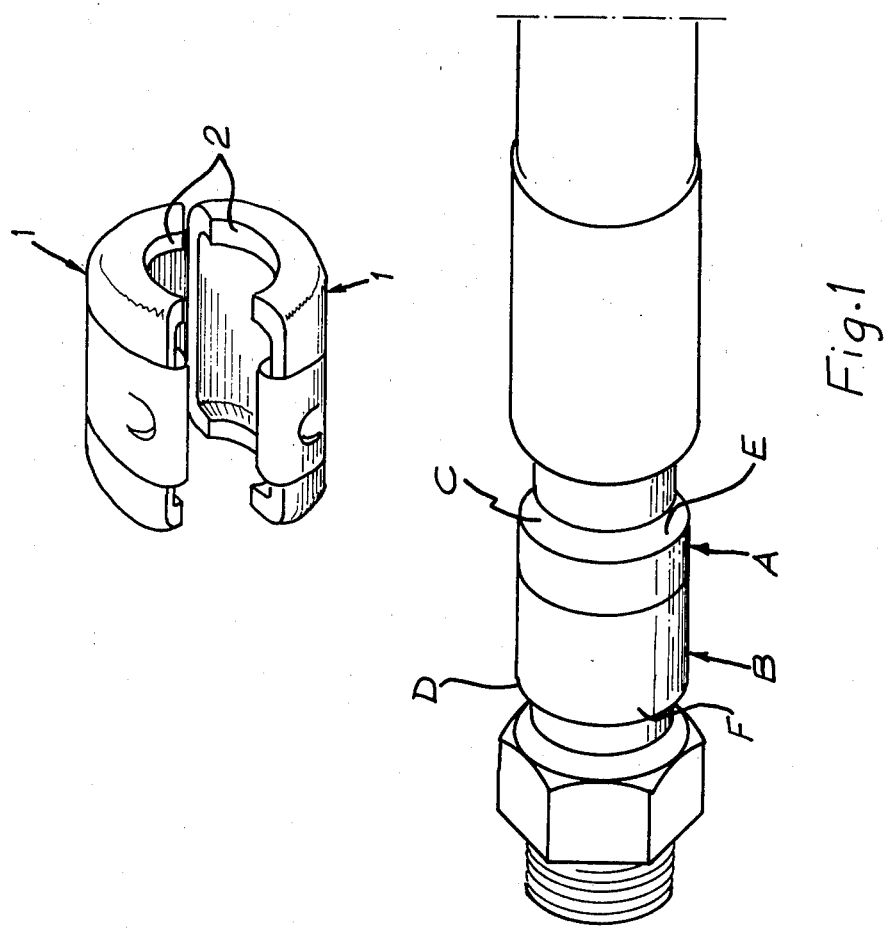
FIG. 1 is a perspective view of a coupling and a unit consisting of locking elements and an enclosing means, before mounting.
Figure 5:
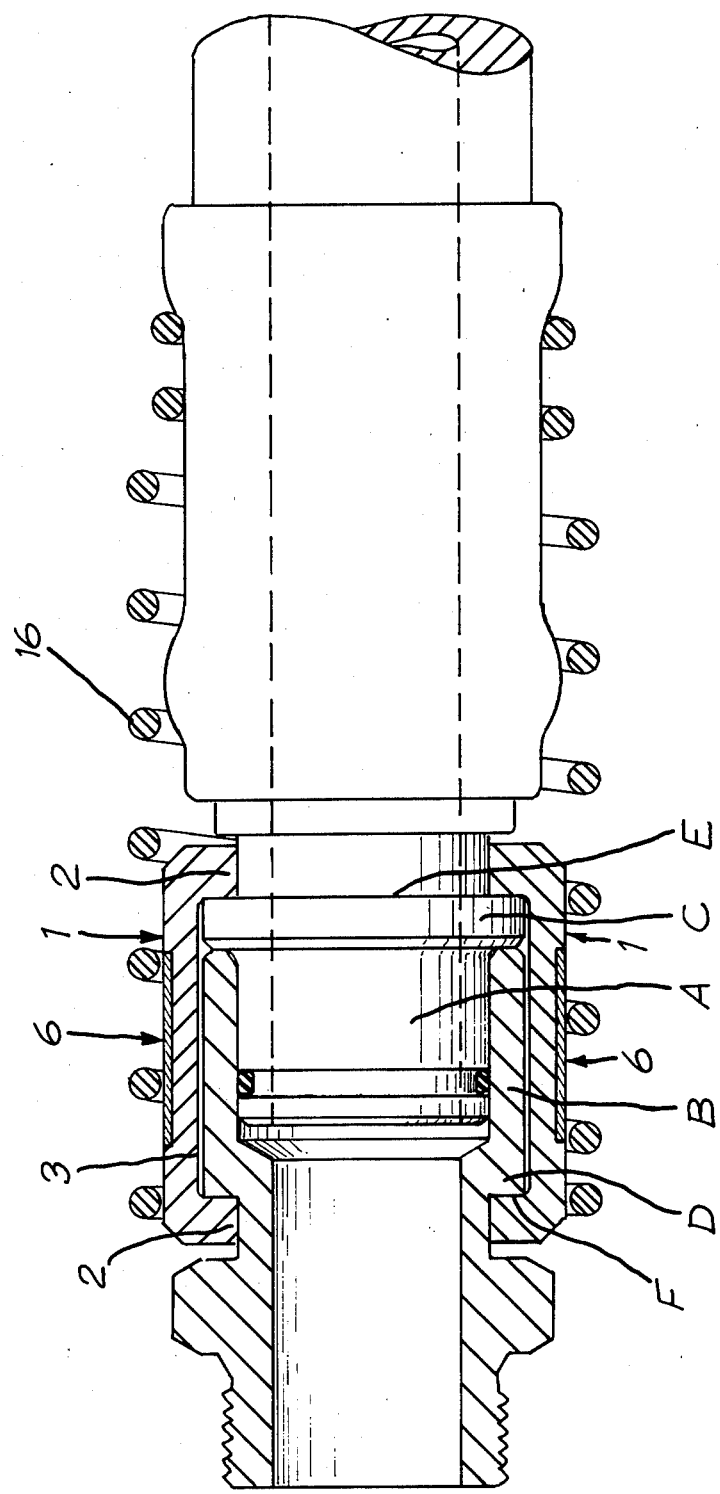
FIG. 5 is a fragmentary longitudinal section of a coupling provided with an additional locking or safety means.

The coupling includes a male member A and a female member B, as best shown in FIG. 5. The coupling members are externally provided with portions C and D which are comparable to flanges forming axially facing radial abutment surfaces E and F. After the coupling members have been pushed together they are fixed in position by means of locking elements 1 which engage the abutment surfaces E and F of the coupling members by means of their inwardly extending edges 2 and prevent axial relative displacement of the coupling members.

Each locking element 1, which is in the form of the arc of a circle and encloses less than half the circumference, has on the inwardly facing side a depression 3 adapted to surround the portions C and D of the coupling members. In the axial sense the depression is defined by the edges 2 which radially define the opening 4 which is intended to join those portions of the coupling members A and B which are situated beyond the abutment surfaces E and F.

Each locking element is on its outwardly facing side provided with a relatively shallow peripheral depression 5 which is adapted to receive the enclosing means 6 and prevent axial displacement thereof relative to the locking elements.

Each locking element is bevelled in one of its axially extending edges 7, which means that the end surface lies in a plane that deviates from the radius towards the centre of said element.

Provided at the opposite end, on the outside of each locking element and adjacent the opposite edge 8, is a wedge-shaped recess 9 and its bottom 10 is inclined so that the recess will have a depth which decreases as counted from the locking element edge 8. The recess 9 is delimited towards the edge 8 by a substantially radially disposed wall 11.

The enclosing means 6 consists of an arcuate band of spring-steel or the like. At 13 either end of the band is bent over more than 180° in inward direction. An inwardly extending tongue 14 is stamped out immediately before the bend at 13.

For assembling the locking elements 1 and the enclosing means 6 the inwardly bent end portions 15 are passed over the edge portion 8 of each locking element, whereupon said edge portions are pushed into the bent end portions at 13. When the tongue 14 reaches the recess 9 it will snap into it, whereby the free edge of the tongue will abut the radial wall 11 and fix the respective locking element 1 to the enclosing means 6.

The locking elements will thus be fixed against displacement in the peripheral sense relative to the enclosing means 6 and adhere thereto also in unmounted condition.

As the locking elements 1 comprise less than half the circumference of the coupling and are held in a fixed position by the enclosing means 6, the locking elements will take a fixed relative position with the bevelled ends 7 slightly spaced apart and the opposite ends 8 spaced apart at a greater distance also in mounted condition. As there is a defined greater interspace between the edges 8 of the locking elements and as these elements can move relative to each other as about a hinge, the free edges 8 of the locking elements need not, for mounting and dismounting purposes, be spaced apart more than required for allowing said edges to get clear of the outer portions of the coupling members. The enclosing means 6 therefore need not be widened by far as much as previously known enclosing means which must be widened to form a gap corresponding to the total outer diameter of the two locking elements.

The fact that the enclosing means is fixed to the locking elements facilitates mounting as well as dismounting. For the purpose of dismounting one may for instance insert a chisel-like tool between the ends 8 or at the bevelled ends 7, whereby the locking elements 1 and the means 6 can be easily separated and detached from the coupling.

In the embodiment shown in FIG. 5 an additional locking or safety device 16 formed like a helical spring, is arranged on the coupling. When the coupling is to be opened the locking device is pulled off in axial direction and is threaded on the outside of the enclosing means after this has been mounted.

Figure 6:
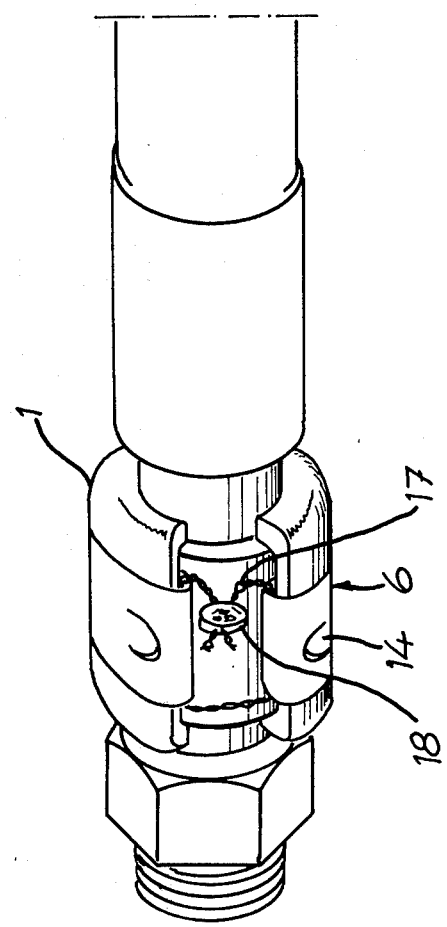
FIG. 6 is a side view of an assembled coupling with seal.

FIG. 6 illustrates how the coupling easily can be sealed by a thread 17 being introduced through the bent end portions 13 of the enclosing means 6 and locked with a leadseal or the like 18.

The invention should not be considered limited to that described above and shown in the drawings but may be modified in various ways within the scope of the appended claims.

What I claim and desire to secure by Letters Patent is:

1. A device for locking pipe and hose couplings of the type comprising two complementary, radially fixed members provided with external, radial abutment surfaces facing on both sides in the axial direction for arcuate locking elements meshing with said abutment surfaces and having inwardly extending end edges, said locking elements being adapted to be fitted over the coupling members and being fixed against radial displacement by a cut ring enclosing said members, wherein the free ends of the ring are bent into U-shape and adapted to straddle and enclose each one edge of one locking element and wherein the ring and the respective locking element are provided with portions which are adapted, on introduction of the locking element edges into the bent-over ends of the ring, to intermesh with a snapping action for positively interlocking the locking element edges in their positions in the bent-over ends of the ring, each end portions of the ring having an inwardly stamped tongue and the outside of each locking member having a recess cooperating with the tongue adjacent that edge which is to be enclosed by and be inserted into said bent end, said recess being delimited towards the locking element edge by a substantially radial wall which serves as an abutment for the free end of the tongue.

* * * * *